US010467675B1

(12) United States Patent
Manelis et al.

(10) Patent No.: US 10,467,675 B1
(45) Date of Patent: Nov. 5, 2019

(54) SYSTEM, DEVICE, AND METHOD DISPLAYING FIRST AND SECOND SCREENS ON DISPLAY SCREEN OF A COMPUTING SYSTEM OR DEVICE

(71) Applicant: JPMorgan Chase Bank, N.A., New York, NY (US)

(72) Inventors: Jim Manelis, Phoenix, AZ (US); Sonia Zacheo, Livingston, NJ (US); Christopher Preuster, Monroe, NJ (US); William F. Mann, Avondale, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 943 days.

(21) Appl. No.: 14/037,682

(22) Filed: Sep. 26, 2013

Related U.S. Application Data

(60) Provisional application No. 61/831,711, filed on Jun. 6, 2013.

(51) Int. Cl.
*G06Q 30/06* (2012.01)
*G06Q 40/02* (2012.01)

(52) U.S. Cl.
CPC ....... *G06Q 30/0629* (2013.01); *G06Q 40/025* (2013.01)

(58) Field of Classification Search
CPC .................................................. G06Q 30/0629
USPC ....................................................... 705/26.64
See application file for complete search history.

(56) References Cited

U.S. PATENT DOCUMENTS

| 5,590,038 | A | * | 12/1996 | Pitroda | G06Q 20/02 235/380 |
| 5,870,721 | A | * | 2/1999 | Norris | G06Q 20/10 705/35 |
| 5,878,403 | A | * | 3/1999 | DeFrancesco | G06Q 20/10 705/35 |
| 5,940,812 | A | * | 8/1999 | Tengel | G06Q 40/025 705/38 |

(Continued)

*Primary Examiner* — Alexis M Casey
(74) *Attorney, Agent, or Firm* — Greenblum & Bernstein, P.L.C.

(57) ABSTRACT

A system is provided for facilitating acquisition of credit products by a customer from a financial institution. At least one computer memory stores customer data and instructions and at least one computer processor accesses the computer memory and executing the stored instructions for performing multiple steps. Steps include receiving over a network, from the customer, a universal application for pre-approval for a suite of credit products and processing the universal application by determining customer eligibility for the credit products. The steps further include selecting available credit products from the suite of credit products based on the customer eligibility and aggregating the available credit products on a user interface and displaying the user interface over a network accessible to a customer computing system, wherein the aggregated available credit products are displayed in a selectable format. The steps additionally include updating the stored customer data and the universal application periodically and updating the available credit products displayed on the user interface based an evaluation of the updated universal application. The steps further include triggering product acquisition upon receiving a selection from the customer an available product through the user interface.

36 Claims, 10 Drawing Sheets

(56) References Cited

U.S. PATENT DOCUMENTS

| | | | | |
|---|---|---|---|---|
| 7,539,628 B2 * | 5/2009 | Bennett | G06Q 30/0207 | 235/376 |
| 7,574,400 B1 * | 8/2009 | Stokum | G06Q 20/10 | 705/35 |
| 7,620,597 B2 * | 11/2009 | Eze | G06Q 40/025 | 705/38 |
| 8,412,593 B1 * | 4/2013 | Song | G06Q 30/00 | 705/27.1 |
| 8,428,915 B1 * | 4/2013 | Nipko | G06F 17/18 | 703/2 |
| 8,606,719 B2 * | 12/2013 | Oliver | G06Q 10/00 | 705/26.64 |
| 8,799,148 B2 * | 8/2014 | Chandran | G06Q 10/10 | 705/38 |
| 2002/0077964 A1 * | 6/2002 | Brody | G06Q 30/02 | 705/38 |
| 2003/0033242 A1 * | 2/2003 | Lynch | G06O 40/00 | 705/38 |
| 2004/0138997 A1 * | 7/2004 | DeFrancesco | G06Q 20/10 | 705/38 |
| 2006/0069641 A1 * | 3/2006 | Merithew | G06Q 40/02 | 705/38 |
| 2006/0106706 A1 * | 5/2006 | LaBonty | G06Q 10/10 | 705/35 |
| 2007/0136162 A1 * | 6/2007 | Thibodeau | G06Q 20/12 | 705/35 |
| 2007/0225992 A1 * | 9/2007 | Palmieri | G06Q 10/10 | 235/380 |
| 2009/0157542 A1 * | 6/2009 | Ingerman | G06Q 40/02 | 705/38 |
| 2010/0076791 A1 * | 3/2010 | Peterson | G06Q 40/06 | 705/4 |
| 2011/0087985 A1 * | 4/2011 | Buchanan | G06F 3/04847 | 715/771 |
| 2011/0270740 A1 * | 11/2011 | Pickett | G06Q 40/00 | 705/38 |
| 2012/0054091 A1 * | 3/2012 | Painter | G06Q 40/02 | 705/38 |
| 2012/0246060 A1 * | 9/2012 | Conyack, Jr. | G06Q 40/02 | 705/38 |
| 2012/0330776 A1 * | 12/2012 | Wenger | G06Q 30/0601 | 705/26.5 |
| 2013/0041841 A1 * | 2/2013 | Lyons | G06Q 50/16 | 705/36 R |
| 2013/0080223 A1 * | 3/2013 | Lavu | G06Q 30/0208 | 705/14.11 |
| 2013/0325667 A1 * | 12/2013 | Satyavolu | G06Q 30/0201 | 705/26.64 |
| 2014/0162598 A1 * | 6/2014 | Villa-Real | H04M 1/66 | 455/411 |

\* cited by examiner understand # SYSTEM, DEVICE, AND METHOD DISPLAYING FIRST AND SECOND SCREENS ON DISPLAY SCREEN OF A COMPUTING SYSTEM OR DEVICE

TECHNICAL FIELD

Embodiments of the invention are related generally to providing and analyzing credit products tailored to fit individual customer needs throughout the course of a customer relationship.

BACKGROUND OF THE INVENTION

In recent years, increasing numbers of credit products have become available and many can be acquired electronically over a network. Typically, banking customers must acquire and complete separate applications for different credit products. For example, if a customer wants both an auto loan and a home equity loan from the same financial institution, the customer will typically be required to complete two separate applications for these loans.

As banking has evolved and banking customers have become more reliant on mobile and real time computing technologies to shape their banking experiences, traditional models of obtaining credit have become antiquated. Customers over the years have filled out applications in person, over the phone, through the mail, or more recently online, for specific credit products. However, these credit applications often require the customer to provide information that the customer's bank may already have. Thus the consumer is duplicating the bank's efforts by completing the application.

A financial institution hosting an Internet banking site may wish to provide its customers with a full range of banking services, e.g., opening and maintaining a checking account, applying for a credit card or loan, paying bills, or accessing brokerage or financial planning services. Before a customer can utilize these services, the customer often must complete a separate application process for each product. Therefore, the customer may be required to complete several applications, often entering the same information, e.g., name, address, telephone and social security number, on multiple applications. This is a significant drawback to the customer. This is also a significant drawback to the Internet banking host because customer dissatisfaction may result in lost accounts. Furthermore, when a customer of a networked service provider completes a service application, application processing may require a significant amount of time. This delay in the application process is a significant drawback.

Additionally, the applications provided to the customers are typically completely blank. Thus, the customer is required to provide all required information on each application form. These steps are typically required even though the information is duplicative and even through the financial institution may already have much of the needed information in its possession. Thus, customers end up providing a financial institution with duplicative information that the financial institution already possesses, thus wasting customer time and effort.

Systems have evolved to eliminate the need for duplication if a customer is applying for multiple financial products simultaneously. For example, commonly assigned U.S. patent application Ser. No. 09/599,602, filed on Jun. 23, 2000, now U.S. Pat. No. 7,831,508, which is hereby incorporated by reference, discloses a consolidated application process which can assist a customer with dynamically completing an application for multiple financial products.

However, when completing such an application, the customer remains unaware of the terms available to the customer for each product and furthermore, whether the product is available to the customer at all. For example, the customer may complete an application for a home equity loan without knowing the interest rate or amount applicable to himself and may apply for a credit card without knowing the credit limit, interest rate, or other terms that he may be offered. Thus, the customer is forced to complete the application without any previewing of the terms and conditions that might be available to him.

Furthermore, throughout the course of customer's life, the customer is likely to acquire multiple credit products such as mortgages, home equity loans, lines of credit, credit cards, auto loans, commercial loans, or other types of credit. Each time the customer is interested in obtaining a credit product, the customer researches available products, analyzes the products, and upon making a decision on a particular product, completes an application to acquire the available product. Thus the customer performs the entire research, analysis, and decision making process without any information regarding the terms and conditions that might be offered to the customer with respect to these products.

Furthermore, each time a customer acquires a credit product, the balance sheet or comprehensive financial picture for that customer changes. Customers generally resort to outside resources to obtain a complete cash flow picture and comparative analysis, without the assistance of the financial institution offering the product. Given the amount of data and information collected by the financial institution about each customer, a solution is needed that will enable the financial institution to assist with providing this information to the customer.

Thus a solution is needed that will enable financial institution customers to complete a single lifetime application for all credit products and allow the application to be updated over time. Thus, the solution should, at all times during the customer relationship, be able to provide a suite of products available to each customer and allow the customer to simply select any product from the suite of available products, without filling out an additional application in order to acquire that product.

SUMMARY OF THE INVENTION

Embodiments of the invention include a system for facilitating acquisition of credit products by a customer from a financial institution. The system includes at least one computer memory storing customer data and instructions and at least one computer processor accessing the computer memory and executing the stored instructions for performing multiple steps. Steps may include receiving over a network, from the customer computing system, a universal application for pre-approval for a suite of credit products. The system processes the universal application by determining customer eligibility for the credit products in the suite and selects available credit products from the suite of credit products based on the customer eligibility. The steps additionally include aggregating the available credit products on a user interface and displaying the user interface over the network accessible to a customer computing system, wherein the aggregated available credit products are displayed in a selectable format. The system further updates the stored customer data and the universal application periodically and subsequently updates the available credit products displayed on the user interface based an evaluation of the updated universal application. The system additionally triggers product acquisition upon receiving a selection from the customer of at least one of the aggregated available products through the user interface.

Embodiments of the invention additionally include a method for facilitating acquisition of credit products by a customer from a financial institution. The method includes accessing at least one computer memory storing customer data and instructions and executing the stored instructions using at least one computer processor to performing multiple steps. The steps include receiving over a network, from the customer computing system, a universal application for pre-approval for a suite of credit products and processing the universal application by determining customer eligibility for the credit products. The method additionally includes selecting available credit products from the suite of credit products based on the customer eligibility and aggregating the available credit products on a user interface and displaying the user interface over the network accessible to the customer computing system. The aggregated available credit products are displayed in a selectable format. The method additionally includes updating the stored customer data and the universal application periodically and updating the available credit products displayed on the user interface based an evaluation of the updated universal application.

Embodiments of the invention include a system for facilitating acquisition of credit products by a customer from a financial institution. The system includes at least one computer memory storing customer data and instructions and at least one computer processor accessing the computer memory and executing the stored instructions for performing multiple steps. Steps may include receiving over a network, from the customer computing system, a universal application for pre-approval for a suite of credit products. The system processes the universal application by determining customer eligibility for the credit products in the suite and selects available credit products from the suite of credit products based on the customer eligibility. The steps additionally include aggregating the available credit products on a user interface and displaying the user interface over the network accessible to a customer computing system, wherein the aggregated available credit products are displayed in a selectable format. The system additionally provides a financial analysis option on the user interface, allowing the customer to review a balance sheet illustrating cash flow based on selection of at least one of the available credit products. The system further updates the stored customer data and the universal application periodically and subsequently updates the available credit products displayed on the user interface based an evaluation of the updated universal application. The method additionally includes triggering product acquisition upon receiving a selection from the customer of at least one of the aggregated available products through the user interface.

Embodiments of the invention additionally include a method for facilitating acquisition of credit products from a financial institution. The method includes accessing at least one computer memory storing customer data and instructions and accessing the stored customer data and executing the stored instructions using at least one computer processor to perform multiple steps. The steps include extracting the customer data from the computer memory and pre-filling the customer data in a universal application for pre-approval for a suite of credit products. The steps further include transmitting the pre-filled application over a network to the customer for verification and receiving over the network, from the customer, verification for the universal application for pre-approval for the suite of credit products. The system processes the universal application by determining customer eligibility for the credit products including determining a maximum debt burden for the customer and translating the maximum debt burden into a maximum allowable credit line. The steps additionally include selecting available credit products from the suite of credit products based on the customer eligibility and the maximum allowable credit line and aggregating the available credit products on a user interface and displaying the user interface over a network accessible to a customer computing system, wherein the aggregated available credit products are displayed in a selectable format. The system further provides a financial analysis option on the user interface, allowing the customer to review a balance sheet illustrating cash flow based on selection of at least one of the available credit products. The financial analysis option further provides a cash flow optimization function. The method additionally includes updating the stored customer data and the universal application periodically throughout a customer relationship between the customer and the financial institution and updating the available credit products displayed on the user interface based an evaluation of the updated universal application.

Embodiments of the invention include a system for facilitating acquisition of credit products by a customer from a financial institution. The system includes at least one computer memory storing customer data and instructions and at least one computer processor accessing the computer memory and executing the stored instructions for performing multiple steps. Steps may include receiving over a network, from the customer computing system, a universal application for pre-approval for a suite of credit products. The system processes the universal application by determining customer eligibility for the credit products in the suite and selects available credit products from the suite of credit products based on the customer eligibility. The steps additionally include aggregating the available credit products on a user interface and displaying the user interface over the network accessible to a customer computing system, wherein the aggregated available credit products are displayed in a selectable format. The system additionally provides a financial analysis option on the user interface, allowing the customer to review a balance sheet illustrating cash flow based on selection of at least one of the available credit products. The system further updates the stored customer data and the universal application periodically and subsequently updates the available credit products displayed on the user interface based an evaluation of the updated universal application. The method additionally includes triggering product acquisition upon receiving a selection from the customer of at least one of the aggregated available products through the user interface.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to facilitating acquisition of credit products for customers of a financial institution. Using the system of the invention, customers have real time access to a suite of credit products throughout their relationship with the financial institution. Furthermore, the system of the invention tells customers how much they can afford, whether they will be approved, and monthly payment amounts. The system of the invention further evaluates whether opportunities are good deals for the customer. The present invention is described in detail below with reference to the attached drawings figures.

Figure 1:
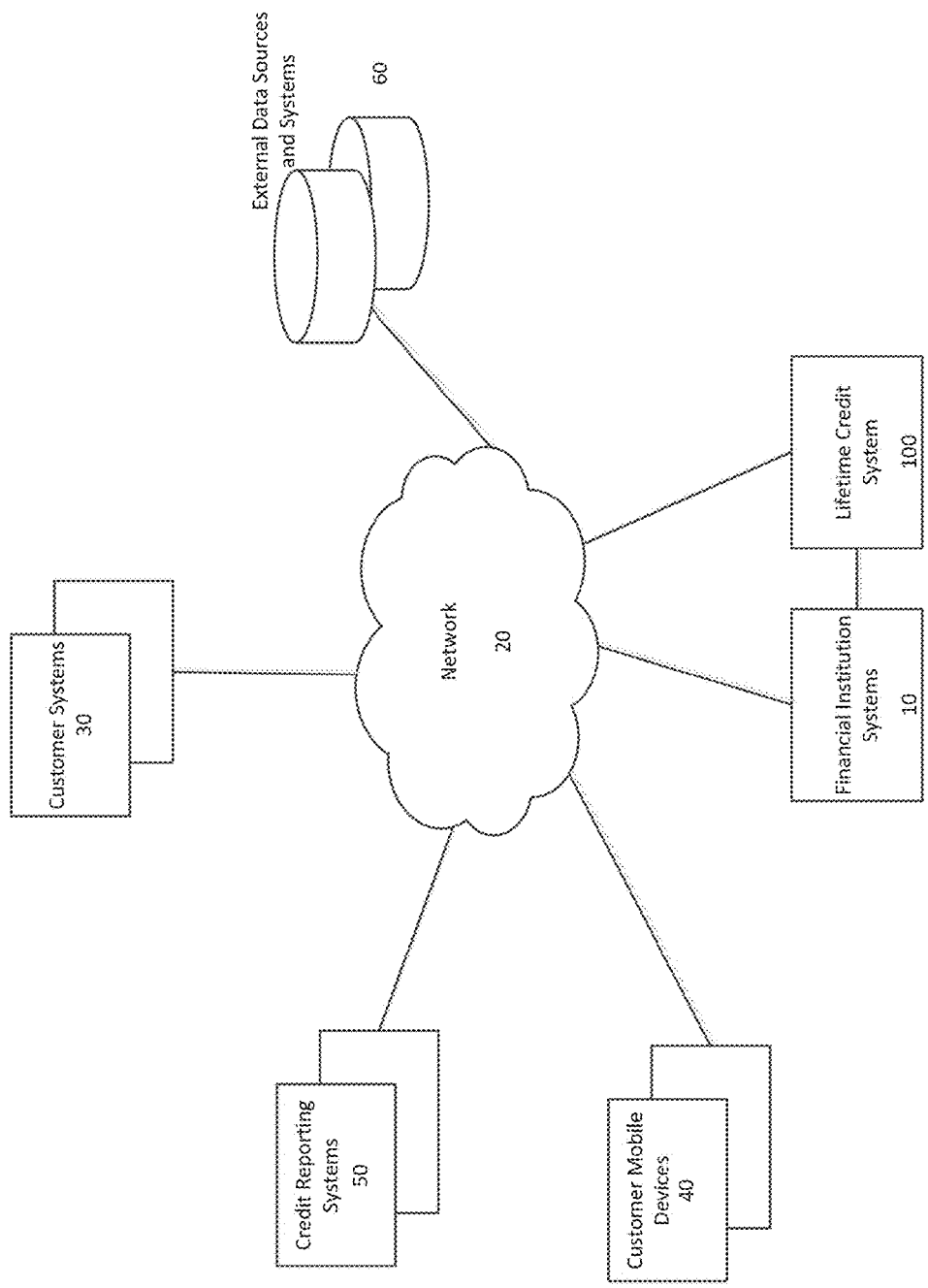
FIG. 1 is a block diagram illustrating an operating environment for a lifetime credit system in accordance with an embodiment of the invention.

FIG. 1 is a block diagram illustrating an operating environment for a lifetime credit system 100 in accordance with an embodiment of the invention. Multiple systems including financial institution systems 10, lifetime credit system 100, external data sources and systems 60, customer systems 30, credit reporting systems 50, and customer mobile devices 40 may be connected to one another over one or more networks 20.

Financial institution systems 10 include those computing systems commonly associated with financial institutions, such as account processing systems and credit card processing systems. Further, financial institution systems 10 may include specific line of business computing systems such as mortgage systems, home equity systems, auto loan systems, and credit card systems.

Lifetime credit system 100 is a computing system that enables customers to have constant real time access to financing offers. The offers change dynamically based upon updates to customer data as well updates in the financial climate, such updates to interest rates. Customers submit a universal application to the lifetime credit system. The universal application enables customers to be evaluated for eligibility to receive all available credit products. The lifetime credit system 100 selects those products for which the customer is eligible and displays them on a user interface for selection by the customer. The customer is empowered to exercise any of the displayed credit offers at any time. To exercise an option, the customer need only select a product from the interface and identify an amount to have the workflow triggered for product acquisition. Thus, the lifetime credit system 100 creates a long term relationship between the financial institution and the customer. Both the financial institution systems 10 and the lifetime credit system 100 may reside on a financial institution host server, which may be or include one or multiple servers.

Customer systems 30 may be or include any computing system capable of communicating over the network 20 with the lifetime credit system 100. While downloadable applications may be provided as discussed below, customers are generally able to communicate over the network 20 with a financial institution server 10 in order to interface with the lifetime credit system 100. For example, customers may implement the customer systems 30 in conjunction with a web browser to access one or more locations identified by a reference, such as a URL, to interact with the lifetime credit system 100. Customer systems 30 may be implemented by the customers to provide information to the lifetime credit system 100 including updates as may be required by the system 100 periodically. The information may include, for example, updates in income, assets, home equity, marital status, number of children or other dependents, number of children in college, and debts of the customers.

Customer mobile devices 40 may be or include mobile computing devices. Such devices may include smart phones such as Androids™ or iPhones™, or tablets such as the iPad™ or laptops or other devices. Mobile applications may be provided so that customers can easily access and manipulate the lifetime credit system offerings on their mobile devices 40. Using the customer mobile devices, customers may be enabled to enroll in the lifetime credit system 100, verify application information, and acquire a credit product from a provided user interface. Mobile applications may be downloadable over the network 20 from the financial institution host server and may be stored in memory and executed by processors to provide a plurality of user interfaces to the customer mobile devices 40 in order to simplify mobile device use. Customers may upload the same data to the lifetime credit system 100 using the mobile devices 40 as they upload using the customer systems 30.

Credit reporting systems 50 may be include agencies such as Experian™ or Equifax™ that score individual credit. External data sources and systems 60 may include practically any external computing system such as merchant computing systems, collection systems, or other financial institution systems.

The network 20 is preferably the Internet, but may be or include other types of networks. Furthermore, even though only one network is shown, multiple networks may be used. The network 20 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 2:
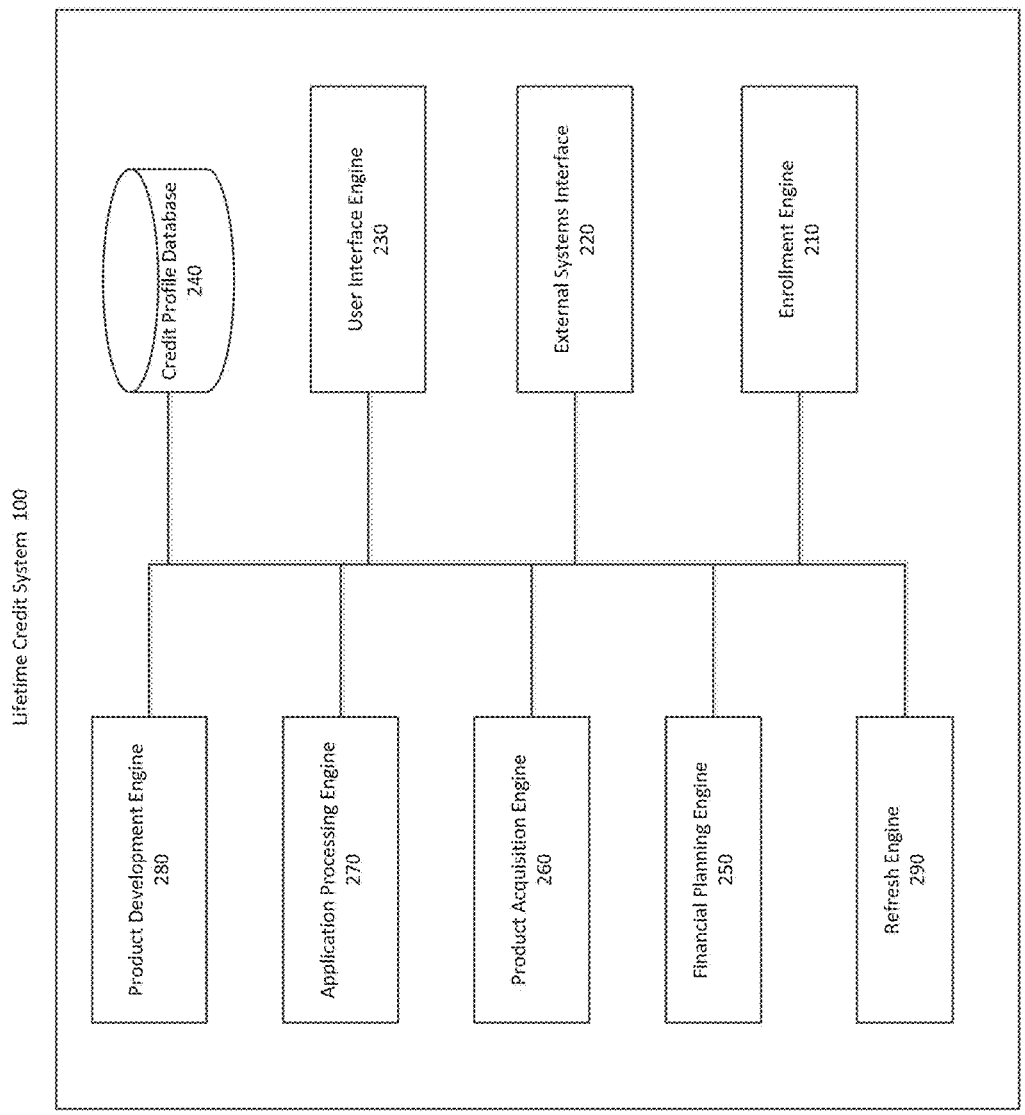
FIG. 2 is a block diagram illustrating a lifetime credit system in accordance with an embodiment of the invention.

FIG. 2 is a block diagram illustrating a lifetime credit system 100 in accordance with an embodiment of the invention. The lifetime credit system 100 may include one or more computers or servers hosted by a financial institution having processors and memories. Features that may be included in the system are an enrollment engine 210, an external systems interface 220, a user interface engine 230, a credit profile database 240, a financial planning engine 250, a product acquisition engine 260, an application processing engine 270, a product development engine 280, and a refresh engine 290. These features may be software engines or may alternatively be separate computer servers including software and connecting with a host server 100 for the lifetime credit system.

The enrollment engine 210 enables the financial institution to present the opportunity for its customers to enroll in the lifetime credit program offered by the system 100 so that the customers will have constantly available credit products. By enrolling in the lifetime credit system, customers receive a commitment from the financial institution for a product suite of credit loans and lines. The system updates credit profiles at intervals based on the customer's personal and product changes. The updates may be based on data from various external sources including data input directly from the customer.

The enrollment engine 210 may operate to enroll customers when the customers request enrollment through a user interface of a customer computing system connected over a network with the lifetime credit system 100. Alternatively, enrollment may be initiated over the phone, by mail, or in a financial institution branch office. In order to take advantage of the lifetime credit system, customers will have an opportunity to enroll upon account opening, during annual reviews, or on a financial institution web site at any time. Most customers having accounts with the financial institution will be eligible for enrollment by the enrollment engine 210. However, the suite of credit products available to each customer will vary based on customer data and resources.

The external systems interface 220 interacts with external systems to collect and process customer data. For example, the external systems interface 220 may interact with credit reporting agencies or with other financial institutions to capture customer data. Furthermore, the external systems interface 220 may interact with other systems at the financial institution in order to execute product acquisition and/or assess the availability of products for the customer. For example, the external systems interface 220 may interact with line of business systems, for example, mortgage systems, or automobile loan systems in order to acquire credit products for each customer.

The user interface engine 230 may interact with other systems components in order to provide the customer with easy-to-understand user interfaces having simple navigational features and selectable products. The lifetime credit system preferably provides a selection of user interfaces that allow customers to navigate through products and find answers to their questions. The user interface engine 330 may, for example, present the selectable products as icons, wherein a user selects an automobile to obtain a car loan, or a credit card icon to obtain a credit card. Alternatively, the product selections may be presented on the user interface in list form. Furthermore, the user interface engine 230 may present user interfaces enabling viewing of cash flow optimization and "what if" scenarios to assist users with visualizing the impact of their financial decision making. The user interface engine 230 may also be configured to provide an interface for receiving periodic updates from customers including parameters related to the customer's current financial situation such as updated income, credit cards, other debts, savings, home equity, or other assets.

The credit profile database 240 may be stored in a computer memory and may include customer data collected from customer accounts within the financial institution. The credit profile database 240 may also include data collected from credit reporting agencies or other external sources and also data provided directly from the customers through customer computing systems over the network, on the telephone, by mail, or in person in a branch location. In embodiments of the invention, the credit profile database 240 may include multiple profiles for individual customers, such as a business profile and a personal banking profile. Furthermore, the credit profile database 240 may maintain a collective profile for a family in addition to the individual profiles. Thus, a family may be offered options such as student loans, or various types of insurance based on data collected about various family members. A data storage area stores the captured data in the credit profile database 240 in any convenient type of storage device. The data storage area may include any hardware device suitable for storing the data and may further implement database tools for management of the data.

The financial planning engine 250 may be provided to generate scenarios based on stored customer data and selectable financial products for which the customer is eligible. For example, the financial planning engine 250 may provide various calculators, such as payment calculators for loans, as well as a cash flow optimizer to illustrate maximization of cash flow with respect to the selectable products for users. The financial planning engine 250 may provide a customer analysis in the form of a balance sheet/income statement summary. The financial planning engine 250 may also provide a "what if" analysis, so that customers can select different credit products to view different financial scenarios. These scenarios may update automatically when customer cash flow and ability to repay are adjusted. The financial planning engine 250 can further make suggestions based on the customer's current debt situation. For example, the financial planning engine 250 might recommend a cash-out refinance for consolidating mortgage debt with credit debt. Thus, through the use of different engines and interfaces, customers can access and manipulate a balance sheet/income statement and a "what if analysis". The system may provide the customer with identification of product concentrations and suggestions based on the customer's current debt situation. A cash flow optimizer tool allows for automated analysis of a consumer's current and potential future financial state. The customer can add various events to his or her financial mix to obtain optimizing suggestions from the credit engine.

The product acquisition engine 260 operates to obtain products for customers when the customer selects a particular product. For example, if the customer is presented with options including a home equity loan and a credit card, the customer may select the home equity loan through the provided user interface. Based on this selection, the product acquisition engine 260 may interact with a home equity line of business system to acquire the selected product for the customer.

The application processing engine 270 operates to assess the completeness of the universal application and implement calculators to evaluate characteristics of the user, such as a borrowing power score and a maximum allowable debt burden. The borrowing power score may be calculated based on all data available, such as income, debt, credit cards, home equity, and assets. Multiple borrowing power scores may exist for a family. For example, a husband a wife may each have an individual borrowing power score, and may also have a joint borrowing power score. Entire families may have a borrowing score, for example, the borrowing score may apply to both parents and two dependent children. In embodiments of the invention, extended family may have a borrowing power score. Students, who may be dependents, may also have a borrowing power score. The application processing engine 270 accesses the credit profile database to leverage customer data in order to pre-fill the application to the extent possible. The customer is then asked to verify pre-filled information and complete any missing information if information is missing. The application also authorizes the financial institution to obtain a credit report, verify stated income, employment, stated asset information, and power of attorney.

The product development engine 280 determines products for which each customer is eligible based on the application processing including the calculated borrowing power score. The product development engine 280 may interact with line of business systems such as a mortgage system, auto loan system, credit system, and other line of business systems. However, in embodiments of the invention, the product development engine 280 may include internal logic for developing products corresponding to the borrowing power score. In this instance, no real time interaction with line of business systems would be required in order to provide available products. The product development engine 280 provides a comprehensive suite of products that allows the customer to effectively finance major purchases and access an emergency reserve of funds at any time during the customer relationship. The major purchases may include, for example, automobiles, homes, vacation homes, or student loans.

The refresh engine 290 may update the credit profile database 240 for each customer on a regular basis. For example, the refresh engine 290 may perform updates on an ongoing or quarterly basis. The updates may be performed by soliciting user input, by re-evaluating user accounts, by seeking information from external sources based on ongoing user approval, or by consulting the customer directly. For example, the refresh engine 290 may send period requests for information to the customer. The requests may, for example, be in the form of an email that includes a selectable link leading to a URL. The accessed page from the URL may allow the customer to enter information such as updates to income, debts, credit cards, loans, home equity, or other assets. In embodiments of the invention, the system may offer the customer rewards, points, premier status, discounts, or financial incentives for completing the information. Furthermore, if the customer fails to complete the information, the borrowing power score may be reduced. If the customer completes the information, the borrowing power score will be recalculated upon each update provided. A combination of these methods may also be utilized. Thus, as the customer goes through personal and product changes, the customer credit profile is updated in the lifetime credit system.

The refresh engine 290 may also collect and leverage information gained through recent customer behaviors, such as online purchasing behaviors, that may indicate major life events, in order to proactively offer desirable products to customers using the lifetime credit system. In embodiments of the invention, in additions to being available through the user interface showing the aggregated products, additional user interfaces may promote these relevant products when the customer visits the financial institution website.

Upon each update, the system may re-compute the maximum debt burden and borrowing power score and translate the result into a projected maximum allowable credit line. Because the customer's credit capacity is dynamic, this information will help the product development engine 280 to identify exactly what products are available to the customer, under what conditions, and for how long.

The engines and systems described above may include software components including instructions executed by a programmed processor to perform the functions described. The engines may include or access databases stored in computer memory to obtain data necessary for execution of instructions. Databases may be provided and accessed both within financial services computing systems and outside of the financial services organization.

All of the components shown in FIGS. 1 and 2 above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 3:
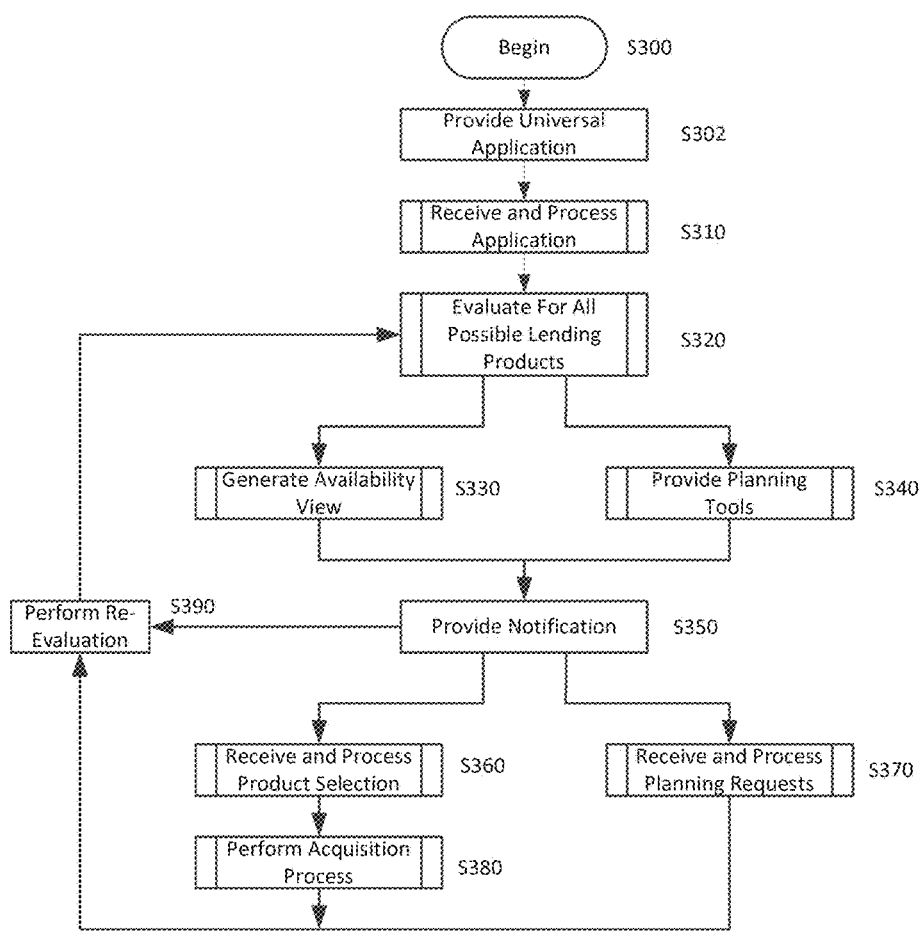
FIG. 3 is a flow chart illustrating a method performed by the lifetime credit system in accordance with embodiments of the invention.

FIG. 3 is a flow chart illustrating a method performed by the lifetime credit system in accordance with embodiments of the invention. The method illustration omits certain steps, such as authentication, which much be performed prior to recognition of the customer by the lifetime credit system. Standard authentication procedures, such as passwords and security questions may be implemented, as well as more advanced security measures such as measurement of biometric parameters. The process begins in S300 and in S302, the system provides a universal application to the customer. As set forth above, the universal application is used to assess availability to the customer of all credit products offered by the financial institution. In S310, the system receives and processes the application. In S320, the system evaluates the customer for all credit products. Based on the evaluation, in S330, the system provides an availability view of the lending products. The lending products are preferably arranged in a selectable manner on a user interface accessible on a user computing device. Also in S340, the system provides planning tools enabling the customer to select available products and develop a strategy based on the ramifications of selecting these products. In S350 the system provides notification to the customer that the product availability view and the planning tools can be accessed. The notification may be an electronic mail notification or may alternatively appear when the customer accesses the financial institution website. If the customer selects a product from the availability view in S330, the system may review and process the selection in S360 and initiate the acquisition process in S380. The products illustrated on the available product view are available in real time to the customer and generally their selection will lead to acquisition. Alternatively in S370, the customer may elect to utilize the planning tools provided in S340. In this instance, the system receives and processes the planning requests in S370.

Throughout the relationship between the financial institution and the customer, the system may proceed to S390 to perform re-evaluation. Re-evaluation may include updating and re-evaluating customer data from internal and/or external sources. Re-evaluation may also include soliciting additional data directly from the customer. The customer may respond to electronic reminders for providing the data. Re-evaluation may also include re-computation of maximum debt burden, and re-calculation of available credit line and recalculation of the borrowing power score. Thus, the updating may also modify the financial analysis and the products available to the customer. Periodically upon updating, if customers have increased the depth of the relationship with the financial institution, the credit product offers may include special relationship pricing for customers. Changes to the borrowing power score may be due to individual factors, such as divorce, marriage, or children in college, or may also or alternatively be due to macroeconomic factors such as changes in market conditions or interest rates.

Figure 4A:
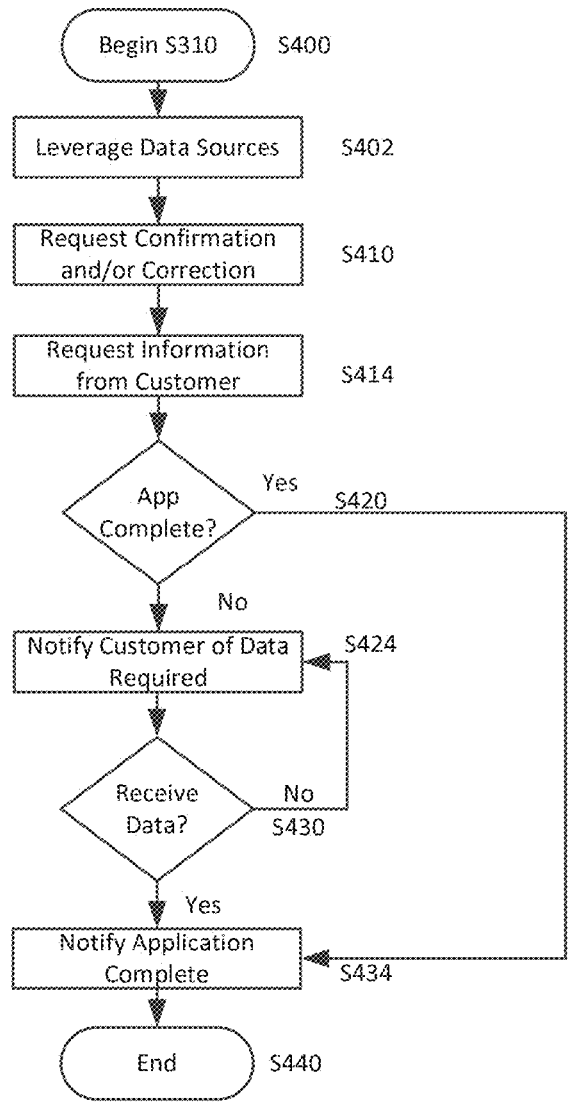
FIG. 4A is a flowchart illustrating an application process in accordance with an embodiment of the invention.

FIG. 4A is a flowchart illustrating an application process in accordance with an embodiment of the invention. The process begins in S400 and the system leverages data sources in S402 to pre-fill the application. The system may acquire the data from the credit profile database or other internal system or may alternatively seek the data from external systems and the customer system. Once the application is pre-filled, the system requests confirmation and/or correction from the customer in S410 and further requests that all information be completed in S414 if any information is missing. If the application is complete in S420, the system notifies the customer that the application is complete in S434. If the application is not complete in S420, the system notifies the customer of required data in S424 until the application becomes complete in S434. The process ends in S440.

Figure 4B:
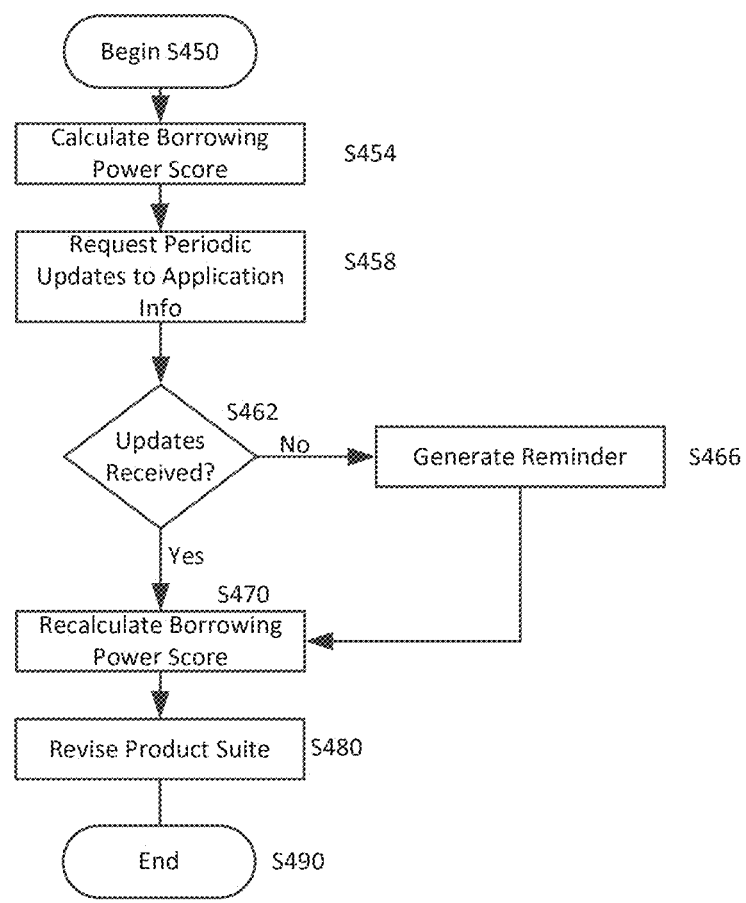
FIG. 4B illustrates a borrowing power score calculation in accordance with an embodiment of the invention.

FIG. 4B illustrates calculation of a borrowing power score in accordance with an embodiment of the invention. The process begins in S450 and the system calculates borrowing power score at S454. The calculation may include input such as income from all sources, total debt, monthly debt, and assets. The assets may be broken down by class, such as by type of account or type of equity. The borrowing power score may be a weighted combination of these factors. Other factors may also be included. The system may further calculate multiple borrowing power scores for a family. For example, the system may calculate borrowing power scores for a husband and a wife separately as well as a joint borrowing power score for the husband and wife. The borrowing power score may also be calculating for an entire family, by taking into account, for example, such factors as student loan debt for the children.

Once the borrowing power score is calculated, the system may request periodic updates to application information in S458. The period update requests may occur annually or less or more frequently. The updates may be requested and obtained directly from the customers. In embodiments of the invention, customers may submit updates without being prompted. Periodic updates may also be requested when system learns of actions consistent with life events, such as marriage, divorce, death of a spouse, or having children. If the updates are not received in S462, the system may generate one or more reminders in S466. Regardless of whether the reminders are successful, the system will continue to request the periodic updates. Whether or not the updates are received in S462, the system recalculates the borrowing power score in S470. If the updates are received, the system may calculate a borrowing power score that is higher, lower, or the same as the previous borrowing power score, depending on changes in the customer's circumstances. If the updates are not received, the borrowing power score will either be lower than the previous borrowing power score, or may be suspended entirely pending the receipt of the updates. In S480, the system revises the product suite based on the borrowing power score. In addition to revision of the product suite, the system may provide rewards, points, or an elevated status to those who submitted updates in response to the periodic request. The system may also generate special offers based on the provision of updates and the revised product suite. The process ends in S490.

In additional embodiments of the invention, the system may evaluate user willingness to use assets as collateral. For example, a suite of products may differ for users who want to use a car, home, or stocks as collateral for a loan. Both interest rates and the structure of the lending product may vary depending upon whether the lending product is secured by collateral assets. Additionally, different types of assets, for example, land or other real property used as collateral may generate different suites of lending products.

Figure 5:
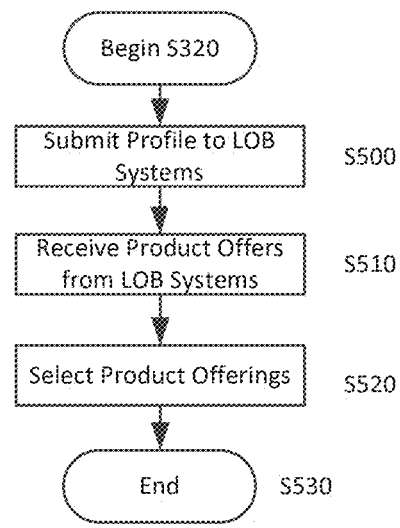
FIG. 5 is a flowchart illustrating a method for evaluating possible lending products in accordance with an embodiment of the invention.

FIG. 5 is a flowchart illustrating a method for evaluating possible lending products in accordance with an embodiment of the invention. The system submits profiles developed from the universal application and the available data to the line of business systems in S500. Alternatively, the lifetime credit system may store internal algorithms for evaluating eligibility for the multiple products in the various lines of business and execute these algorithms in order to determine offerings and/or eligibility. In S510, the system receives product offers from the line of business systems. In S520, the system may optionally conduct further analysis to select product offerings to provide to the customer. Alternatively, the system may simply provide all product offerings supplied by the lines of business to the customer. The process ends in S530. This process is merely exemplary as the lifetime credit system may implement its own logic for locating available products for each customer. Although this algorithm represents one embodiment of the invention, as set forth above, the system may also include the internal logic to locate and evaluated products based on the calculated parameters.

Figure 6:
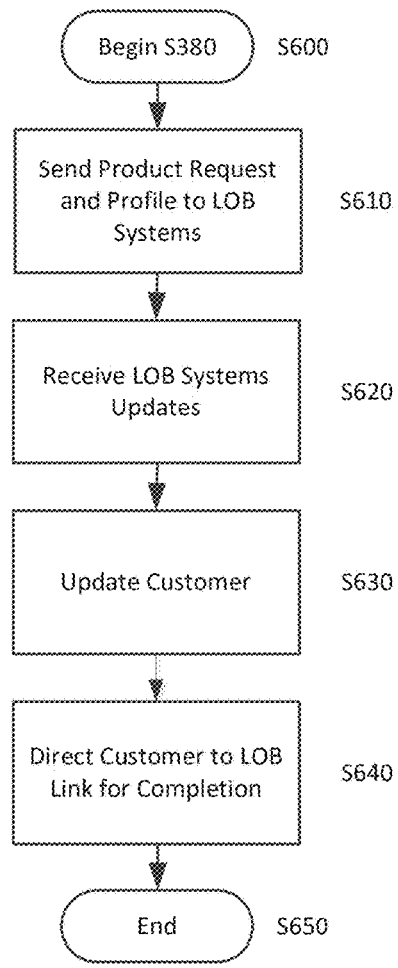
FIG. 6 is a flow diagram illustrating acquisition of selected products in accordance with embodiments of the invention.

FIG. 6 is a flow diagram illustrating acquisition of selected products in accordance with embodiments of the invention. The method begins in S600 after the customer selects one or more products from the suite of available products, and in S610, the system sends the product request and profile to the line of business. In S620, the system receives line of business systems updates and the system updates the customer in S630. In S640, the lifetime credit system directs the customer to the line of business system for completion of acquisition. The lifetime credit system may direct the customer by provided a URL to direct the customer to a line of business web page. Other scenarios for product acquisition are also within the scope of the invention. The process ends in S650.

Figure 7:
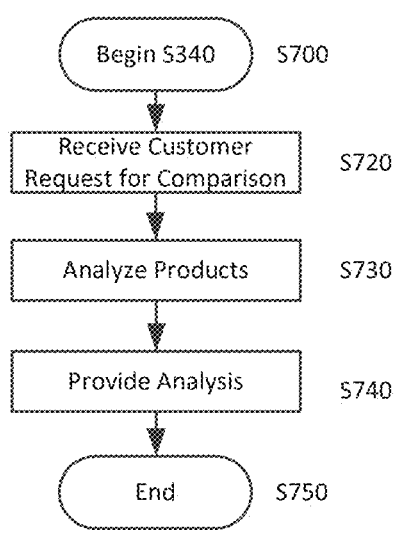
FIG. 7 is a flow diagram illustrating a comparison method in accordance with an embodiment of the invention.

FIG. 7 is a flow diagram illustrating a comparison method in accordance with an embodiment of the invention. While many financial analysis options may be available to the customer, in one embodiment of the invention, the process, beginning in S700 may receive a customer request for comparison in S720. For example, the customer may be requesting an amortization comparison for the mortgage products offered in fifteen vs. thirty year terms. In S730, the system may analyze the products and in S740, the system may provide the analysis to the customer. In embodiments of the invention, the analysis may be in the form of a spreadsheet or balance sheet. The process ends in S750. Additionally, the analysis may illustrate to the customer the impact of the borrowing power score and may provide options for increasing the borrowing power score. Increasing the borrowing power score may be as simple as providing the updates periodically requested. Alternatively, increasing the borrowing power score may require the customer to pay off high-interest credit card debt. Furthermore, increasing the borrowing power score may be achieved by a cash out re-finance that combines all credit card and home equity debt with mortgage debt at a low interest rate. If the user selects an option to "raise my borrowing power score", all available options may be provided to the user on the user interface. As an additional example, if the customer wants a loan of $100,000 to cover college expenses, the customer may enter this request and the system will provide all available options. While student loans may be one option, a home equity loan may be provided as a preferred option.

Based on the customer's borrowing power score, the system will provide these scenarios using the amounts and interest rates available to that particular customer based on the customer's updated information in the credit profile database.

Figure 8:
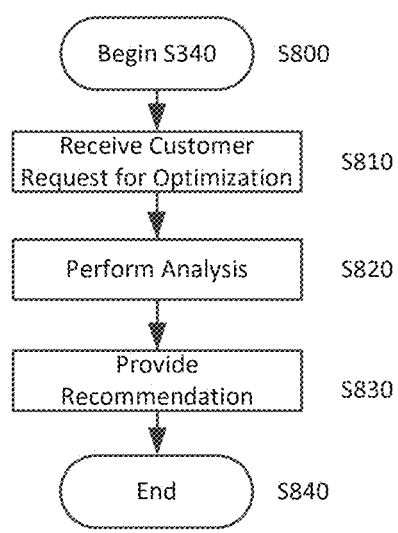
FIG. 8 is a flow chart illustrating an optimization method in accordance with an embodiment of the invention.

FIG. 8 is a flow chart illustrating an optimization method in accordance with an embodiment of the invention. The method begins in S800 and the system receives a request from the customer for optimization in S810. An optimization request may take many forms, for example optimizing cash output so that the user's payments for all debts are as small as possible. The system may process the request in S820 and provide a recommendation in S830. Preferably the recommendation provides a visual scenario so that customers are able to view cash output in multiple scenarios. The process ends in S840. Many optimization scenarios are within the scope of the invention. For example, customers may provide the system with a particular goal and the system may provide the customer with an optimal way to achieve that goal. The particular goal may include, for example, the acquisition of a 500K lake house, or the purchase of a new car. Based on the user's borrowing power score and current borrowing structure, the system may provide an optimal re-structuring to help the customer achieve his or her goals. For example, the system may determine that the customer qualifies for a 300K home equity loan at 4% interest and that based on the customer's account balances, the customer can pay the remaining 200K for the lake house. Alternatively, the system may determine that the customer can perform a cash-out refinance to cover the balance and purchase the lake house. For the car purchase, the system may determine that the customer does not qualify for the loan unless the customer eliminates high interest credit card debt. Therefore the system may propose alternatives for eliminating the debt. The system may suggest based on the customer's savings account balances that if the customer pays the credit card debt out of savings, the customer would qualify for the car loan.

Figure 9:
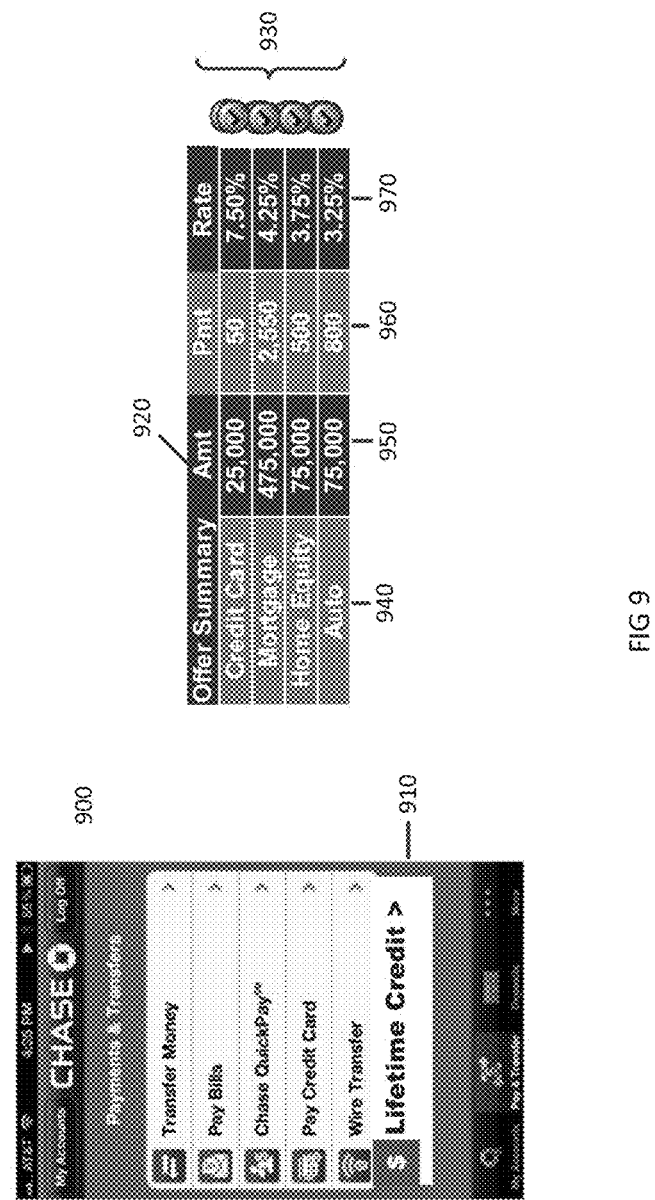
FIG. 9 is a user interface illustrating provision of a product selection in accordance with embodiments of the invention.

FIG. 9 is a user interface illustrating provision of a product selection interface in accordance with embodiments of the invention. The financial institution interface 900 displays a lifetime credit tab at 910. When selected, the lifetime credit tab provides an offer summary 920 including multiple products 940, such as credit card, mortgage, home equity, and auto credit products. For each type of product, an amount 950 is listed. For example, the credit card may have a $25,000 credit limit. The mortgage may be limited to $475,000. The home equity loan may be limited to $75,000 and the auto loan may be limited to $75,000. These amounts may be determined based on the calculated maximum allowable debt burden for each customer or combination of customers when borrowing power for a family is under consideration. Adjacent the amount, the interface 920 may include a monthly payment amount, which is displayed as $50 for credit card, $2550 for mortgage, $500 for home equity, and $800 for auto. Interest rates 970 are correspondingly listed as 7.5% for the credit card, 4.25% for the mortgage, 3.75% for the home equity, and 3.25% for auto. The products may be displayed in a selectable format, for example, by checkmarks at 930.

Thus, a simple to use interface is provided for viewing and selecting available offers. The offers are updated periodically and since the user is pre-approved, the user need only select the offers to start the acquisition process. Additionally, the user is able to make an informed product selection based on the financial analysis engine that provides optimization and "what if" scenarios to the customer.

The system of the invention encourages customers to invest with the financial institution, as the level of information available to financial institution increases in combination with the customer relationship. In embodiments of the invention, customers may reach predetermined relationship levels to achieve elevated status, such as gold, silver or platinum. Furthermore, customer involvement may be extracted from both personal and business banking profiles, such that the level of information available to the financial institution for selecting available products increases.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A system comprising:
a first computing system of a user comprising a display screen; and
a second computing system communicating with the first computing system via a communication network, the second computing system comprising:
a computer processor; and
a memory coupled to the computer processor and storing programmed instructions, the computer processor being configured to execute the stored programmed instructions,
i) the display screen of the first computing system displaying a first screen simultaneously displaying a plurality of selectable tabs including
a transfer money tab, the selection of which permits the user to transfer money,
a bill pay tab, the selection of which permits the user to pay a bill,
a credit-card pay tab, the selection of which permits the user to pay a credit-card bill, and
a lifetime credit tab, representing user enrollment in a lifetime credit program providing constantly available, pre-approved credit products for the user, and when selected, causes the display screen to display a different, second screen simultaneously displaying
a) a selectable listing of pre-approved credit products, the selecting of any of which starts a process of acquiring the selected pre-approved credit product, the listed pre-approved credit products including at least two of
a pre-approved credit card,
a pre-approved mortgage,
a pre-approved home equity loan, and
a pre-approved auto loan, and
b) at least two of
the maximum limits on each pre-approved credit product in the displayed listing,
the periodic payments due on each pre-approved credit product in the displayed listing, and
the interest rate for each pre-approved credit product in the displayed listing,
thereby simultaneously displaying on the first screen tabs permitting bill pay and money transfer, and a selectable lifetime credit tab, permitting the user to initiate from a single screen a money transfer, a bill payment, a credit-card payment, the addition of a new pre-approved credit product to products used by the user; and
ii) the display screen of the first computing system displaying the second screen in response to only the selection of the lifetime credit tab, the second screen simultaneously displaying
a) the selectable listing of pre-approved credit products, the selecting of any of which starts a process of acquiring the selected pre-approved credit product, the listed pre-approved credit products including at least two of
the pre-approved credit card,
the pre-approved mortgage,
the pre-approved home equity loan, and
the pre-approved auto loan, and
b) at least two of
the maximum limits on each pre-approved credit product in the displayed listing,
the periodic payments due on each pre-approved credit product in the displayed listing, and
the interest rate for each pre-approved credit product in the displayed listing, and
the displaying of the first and second screens on the display screen of the first computing device being performed in response to the computer processor of the second computing device
automatically and periodically updating stored original data of the user;
automatically pre-approving the user for the offered credit products;
generating a user interface comprising the first screen and the second screen; and
transmitting the user interface over the communication network to the first computing system in response to a request received from the first computing system.

2. The system of claim 1, wherein the computer processor of the second computing system is further configured to execute the stored programmed instructions to provide a financial analysis option on the user interface, displaying on the display screen of the first computing system a balance sheet illustrating cash flow in response to selection of one of the listed pre-approved credit products displayed on the second screen.

3. The system of claim 1, wherein the computer processor of the second computing system is further configured to execute the stored programmed instructions to calculate a maximum allowable debt burden for the user.

4. The system of claim 3, wherein the computer processor selects one of the listed pre-approved credit products listed on the second screen based on the maximum allowable debt burden of the user.

5. The system of claim 1, wherein the original user data is stored in a customer credit profile and the original user data includes one or more account balances, a credit score, or an annual income.

6. The system of claim 1, wherein the computer processor of the second computing system is further configured to execute the stored programmed instructions to request one or more updates to the original user data from the first computing system device periodically.

7. The system of claim 1, wherein the computer processor of the first computing system is further configured to execute the stored programmed instructions to provide multiple systems with a maximum available debt burden for the user.

8. The system of claim 1, wherein the pre-approved credit products are available to the user in real time.

9. The system of claim 8, wherein the computer processor of the second computing system is further configured to execute the stored programmed instructions to interact with a computing device to acquire the pre-approved credit products on behalf of the user in response to receiving the selection from the first computing system.

10. The system of claim 1, wherein the computer processor is further configured to execute the stored programmed instructions to calculate a borrowing power score based on the original user data to determine when the user is eligible for each of the pre-credit approved products.

11. The system of claim 10, wherein the borrowing power score is a combined score representing a borrowing power of a family associated with the user.

12. A method comprising:
i) displaying on a display screen of a first computing system of a user a first screen simultaneously displaying a plurality of selectable tabs, including
   a transfer money tab, the selection of which permits the user to transfer money,
   a bill pay tab, the selection of which permits the user to pay a bill,
   a credit-card pay tab, the selection of which permits the user to pay a credit-card bill, and
   a lifetime credit tab, representing user enrollment in a lifetime credit program providing constantly available, pre-approved credit products for the user, and when selected, causes the display screen to display a different, second screen simultaneously displaying
      a) a selectable listing of pre-approved credit products, the selecting of any of which starts a process of acquiring the selected pre-approved credit product, the listed pre-approved credit products including at least two of
         a pre-approved credit card,
         a pre-approved mortgage,
         a pre-approved home equity loan, and
         a pre-approved auto loan, and
      b) at least two of
         the maximum limits on each pre-approved credit product in the displayed listing,
         the periodic payments due on each pre-approved credit product in the displayed listing; and
         the interest rate for each pre-approved credit product in the displayed listing,
   thereby simultaneously displaying on the first screen tabs permitting bill pay and money transfer, and a selectable lifetime credit tab, permitting the user to initiate from a single screen a money transfer, a bill payment, a credit-card payment, and the addition of a new pre-approved credit product to products used by the user; and
ii displaying on the display screen of the first computing system the second screen in response to only the selection of the lifetime credit tab, the second screen simultaneously displaying
   a) the selectable listing of pre-approved credit products, the selecting of any of which starts a process of acquiring the selected pre-approved credit product, the listed pre-approved credit products including at least two of
      the pre-approved credit card,
      the pre-approved mortgage,
      the pre-approved home equity loan, and
      the pre-approved auto loan, and
   b) at least two of
      the maximum limits on each pre-approved credit product in the displayed listing,
      the periodic payments due on each pre-approved credit product in the displayed listing, and
      the interest rate for each pre-approved credit product in the displayed listing, and
   the displaying of the first and second screens on the display screen of the first computing device being performed in response to the computer processor of the second computing device
      automatically and periodically updating stored original data of the user;
      automatically pre-approving the user for the offered credit products based on the updated original user data;
      generating a user interface comprising the first and second screens; and
      transmitting the user interface over a communication network to the first computing system.

13. The method of claim 12, further comprising displaying on the display screen of the first computing device a financial analysis option, displaying a balance sheet illustrating cash flow of the user in response to selection of one of the listed pre-approved credit products displayed on the second screen.

14. The method of claim 12, further comprising calculating with the computer processor of the second computing system a maximum allowable debt burden for the user customer.

15. The method of claim 14, further comprising selecting with the computer processor of the second computing system one of the listed pre-approved credit products on the second screen based on the maximum allowable debt burden.

16. The method of claim 12, wherein the original user data is stored in a user credit profile and the original user data includes one or more account balances, a credit score, and an annual income.

17. The method of claim 12, further comprising requesting with the first computing system updates to the original user data periodically.

18. The method of claim 12, wherein the computer processor of the second computing system provides additional computing systems with a maximum available debt burden for the user.

19. The method of claim 12, wherein the computer processor of the second computing system provides the pre-approved credit products to the user in real time.

20. The method of claim 19, wherein the computer processor of the second computing system interacts with additional computing systems to acquire the pre-approved credit products on behalf of the user in response to receiving a selection from the first computing system.

21. The method of claim 12, further comprising calculating with the computer processor of the second computing system a borrowing power score based on the original user data to determine when the user is eligible for each of the pre-approved credit products.

22. The method of claim 12, wherein the borrowing power score is a combined score representing borrowing power of a family associated with the user.

23. A non-transitory computer readable medium having stored thereon instructions for displaying a user interface on a display screen of a first computing system of a user comprising executable code which when executed by a computer processor of a second computing system, communicating with the first computing system via a communication network, causes the computer processor of the second computing system to control the display screen of the first computing system to:
  i) display on the display screen of the first computing system a first screen of the user interface simultaneously displaying a plurality of selectable tabs including
    a transfer money tab, the selection of which permits the user to transfer money,
    a bill pay tab, the selection of which permits the user to pay a bill,
    a credit-card pay tab, the selection of which permits the user to pay a credit-card bill, and
    a lifetime credit tab, representing user enrollment in a lifetime credit program providing constantly available, pre-approved credit products for the user, and, when selected, causes the display screen of the first computing system to display a different, second screen of the user interface simultaneously displaying
      a) a selectable listing of pre-approved credit products, the selecting of any of which starts a process of acquiring the selected pre-approved credit product, the listed pre-approved credit products including at least two of
        a pre-approved credit card,
        a pre-approved mortgage,
        a pre-approved home equity loan, and
        a pre-approved auto loan, and
      b) at least two of
        the maximum limits on each pre-approved credit product in the displayed listing,
        the periodic payments due on each pre-approved credit product in the displayed listing, and
        the interest rate for each pre-approved credit product in the displayed listing,
      thereby simultaneously displaying on the first screen tabs permitting bill pay and money transfer, and a selectable lifetime credit tab, permitting the user to initiate from a single screen a money transfer, a bill payment, a credit-card payment, and the addition of a new pre-approved credit product to products used by the user; and
  ii) display on the display screen of the first computing system the second screen in response to only the selection of the lifetime credit tab, the second screen simultaneously displaying
    a) the selectable listing of pre-approved credit products, the selecting of any of which starts a process of acquiring the selected pre-approved credit product, the listed pre-approved credit products including at least two of
      the pre-approved credit card,
      the pre-approved mortgage,
      the pre-approved home equity loan, and
      the pre-approved auto loan, and
    b) at least two of
      the maximum limits on each pre-approved credit product in the displayed listing,
      the periodic payments due on each pre-approved credit product in the displayed listing, and
      the interest rate for each pre-approved credit product in the displayed listing, and
  the displaying of the first and second screens on the display screen of the first computing device being performed in response to the computer processor of the second computing device
    automatically and periodically updating stored original user data;
    automatically pre-approving the user for the offered credit products;
    generating the user interface comprising the first screen and the second screen; and
    transmitting the user interface over the communication network to the first computing system in response to a request received from the first computing system by the computer processor of the second computing system.

24. The non-transitory computer readable medium of claim 23, wherein the executable code, when executed by the computer processor of the second computing system further causes the computer processor of the second computing system to include a financial analysis option in the user interface transmitted to the display screen of the first computing system, and to display on the display screen of the first computing system a balance sheet illustrating cash flow of the user in response to the selection of one of the listed pre-approved credit products displayed on the second screen.

25. The non-transitory computer readable medium of claim 23, wherein the executable code, when executed by the computer processor of the second computing system further causes the computer processor of the second computing system to calculate a maximum allowable debt burden for the user.

26. The non-transitory computer readable medium of claim 25, wherein the computer processor of the second computing system selects one of the pre-approved credit products based on the maximum allowable debt burden.

27. The non-transitory computer readable medium of claim 23, wherein the original user data is stored in a user profile and the original user data includes one or more of account balances, a credit score, and an annual income.

28. The non-transitory computer readable medium of claim 23, wherein the executable code, when executed by the computer processor of the second computing system further causes the computer processor of the second computing system to request an update to the original user data from the first computing system.

29. The non-transitory computer readable medium of claim 23, wherein the executable code, when executed by the computer processor of the second computing system further causes the computer processor of the second computing system to provide other computing systems with a maximum available debt burden for the user.

30. The non-transitory computer readable medium of claim 23, wherein the computer processor of the second computing system provides the pre-credit approved products to the user in real time.

31. The non-transitory computer readable medium of claim 30, wherein the executable code, when executed by the computer processor of the second computing system further causes the computer processor of the second computing system to interact with other computing systems via the communication network to acquire the pre-approved credit products on behalf of the user in response to receiving a selection from the first computing system.

32. The non-transitory computer readable medium of claim 23, wherein the executable code, when executed by the computer processor of the second computing system further causes the computer processor of the second computing system to calculate a borrowing power score based on the original user data to determine when the user is eligible for each of the pre-approved credit products.

33. The non-transitory computer readable medium of claim 23, wherein the borrowing power score is a combined score representing borrowing power of a family associated with the user.

34. A first computing device comprising:
a computer processor;
a memory coupled to the computer processor and storing programmed instructions, the computer processor being configured to execute the stored programmed instructions; and
a display screen of the user coupled to the computer processor,
i) the display screen displaying a first screen simultaneously displaying a plurality of selectable tabs including
a transfer money tab, the selection of which permits the user to transfer money,
a bill pay tab, the selection of which permits the user to pay a bill,
a credit-card pay tab, the selection of which permits the user to pay a credit-card bill, and
a lifetime credit tab, representing user enrollment in a lifetime credit program providing constantly available, pre-approved credit products for the user, and, when selected, causes the display screen to display a different second screen simultaneously displaying
a) a selectable listing of pre-approved credit products, the selecting of any of which starts a process of acquiring the selected pre-approved credit product, the listed pre-approved credit products including at least two of
a pre-approved credit card,
a pre-approved mortgage,
a pre-approved home equity loan, and
a pre-approved auto loan, and
b) at least two of
the maximum limits on each pre-approved credit product in the displayed listing,
the periodic payments due on each pre-approved credit product in the displayed listing, and
the interest rate for each pre-approved credit product in the displayed listing,
thereby simultaneously displaying on the first screen tabs permitting bill pay and money transfer, and a selectable lifetime credit tab, permitting the user to initiate from a single screen a money transfer, a bill payment, a credit-card payment, and the addition of a new pre-approved credit product to products used by the user; and
ii) the display screen of the first computing device displaying the second screen in response to only the selection of the lifetime credit tab, the second screen simultaneously displaying
a) the selectable listing of pre-approved credit products, the selecting of any of which starts a process of acquiring the selected pre-approved credit product, the listed pre-approved credit products including at least two of
the pre-approved credit card,
the pre-approved mortgage,
the pre-approved home equity loan, and
the pre-approved auto loan, and
b) at least two of
the maximum limits on each pre-approved credit product in the displayed listing,
the periodic payments due on each pre-approved credit product in the displayed listing, and
the interest rate for each pre-approved credit product in the displayed listing, and
the displaying of the first and second screens on the display screen of the first computing device being performed in response to a computer processor of a second computing device:
automatically and periodically updating stored original data of the user;
automatically pre-approving the user for the offered credit products based on the updated original user data;
generating a user interface comprising the first screen and the second screen; and
transmitting the user interface over a communication network to the first computing device in response to a request received from the first computing device.

35. A method comprising:
i) displaying on a display screen of a first computing device of a user a first screen simultaneously displaying a plurality of selectable tabs including
a transfer money tab, the selection of which permits the user to transfer money,
a bill pay tab, the selection of which permits the user to pay a bill,
a credit-card pay tab, the selection of which permits the user to pay a credit-card bill, and
a lifetime credit tab, representing user enrollment in a lifetime credit program providing constantly available, pre-approved credit products for the user, and when selected, causes the display screen to display a different, second screen simultaneously displaying
a) a selectable listing of pre-approved credit products, the selecting of any of which starts a process of acquiring the selected pre-approved credit product, the listed pre-approved credit products including at least two of
a pre-approved credit card,
a pre-approved mortgage,
a pre-approved home equity loan, and
a pre-approved auto loan, and b) at least two of
- the maximum limits on each pre-approved credit product in the displayed listing,
- the periodic payments due on each pre-approved credit product in the displayed listing, and
- the interest rate for each pre-approved credit product in the displayed listing, thereby simultaneously displaying on the first screen tabs permitting bill pay and money transfer, and a selectable lifetime credit tab, permitting the user to initiate from a single screen a money transfer, a bill payment, a credit-card payment, and the addition of a new pre-approved credit product to products used by the user, and ii) displaying on the display screen of the first computing device the second screen in response to only the selection of the lifetime credit tab, the second screen simultaneously displaying
  a) the selectable listing of pre-approved credit products, the selecting of any of which starts a process of acquiring the selected pre-approved credit product, the listed pre-approved credit products including at least two of
  - the pre-approved credit card,
  - the pre-approved mortgage,
  - the pre-approved home equity loan, and
  - the pre-approved auto loan, and
  b) at least two of
  - the maximum limits on each pre-approved credit product in the displayed listing,
  - the periodic payments due on each pre-approved credit product in the displayed listing, and
  - the interest rate for each pre-approved credit product in the displayed listing, and the displaying of the first and second screens on the display screen of the first computing device being performed in response to a computer processor of a second computing device, communicating with the first computing device via a communication network:
- automatically and periodically updating stored original data of the user;
- automatically pre-approving the user for the offered credit products;
- generating a user interface comprising the first and second screens; and
- transmitting the user interface over the communication network to the first computing device.

36. A computing device of a user comprising:
a memory storing programmed instructions; and
a computer processor coupled to the memory and executing the programmed instructions to control a display screen to display a user interface, the user interface
i) displaying a first screen, which simultaneously displays a plurality of selectable tabs including
  - a transfer money tab, the selection of which permits the user to transfer money,
  - a bill pay tab, the selection of which permits the user to pay a bill,
  - a credit-card pay tab, the selection of which permits the user to pay a credit-card bill, and
  - a lifetime credit tab, representing user enrollment in a lifetime credit program providing constantly available, pre-approved credit products for the user, and when selected, causes the display screen to display a different, second screen simultaneously displaying
    a) a selectable listing of pre-approved credit products, the selecting of any of which starts a process of acquiring the selected pre-approved credit product, the listed pre-approved credit products including at least two of
    - a pre-approved credit card,
    - a pre-approved mortgage,
    - a pre-approved home equity loan, and
    - a pre-approved auto loan, and
    b) at least two of
    - the maximum limits on each pre-approved credit product in the displayed listing,
    - the periodic payments due on each pre-approved credit product in the displayed listing,
    - the interest rate for each pre-approved credit product in the displayed listing, thereby simultaneously displaying on the first screen tabs permitting bill pay and money transfer, and a selectable lifetime credit tab, permitting the user to initiate from a single screen a money transfer, a bill payment, a credit-card payment, and the addition of a new pre-approved credit product to products used by the user, and ii) displaying the second screen in response to only the selection of the lifetime credit tab, the second screen simultaneously displaying
  a) the selectable listing of pre-approved credit products, the selecting of any of which starts a process of acquiring the selected pre-approved credit product, the listed pre-approved credit products including at least two of
  - the pre-approved credit card,
  - the pre-approved mortgage,
  - the pre-approved home equity loan, and
  - the pre-approved auto loan, and
  b) at least two of
  - the maximum limits on each pre-approved credit product in the displayed listing,
  - the periodic payments due on each pre-approved credit product in the displayed listing, and
  - the interest rate for each pre-approved credit product in the displayed listing, and the displaying of the first and second screens on the display screen being performed in response to the computer processor
- automatically and periodically updating stored original data of the user;
- automatically pre-approving the user for the offered credit products based on the updated original user data;
- generating the user interface comprising the first screen and the second screen; and
- transmitting the user interface over a communication network to the display screen in response to a request from the display screen.

* * * * *